United States Patent
Clark et al.

(10) Patent No.: US 12,103,670 B2
(45) Date of Patent: Oct. 1, 2024

(54) VERTICAL TAKE-OFF AND LANDING (VTOL) AIRCRAFT

(71) Applicant: BETA AIR, LLC, South Burlington, VT (US)

(72) Inventors: Kyle Clark, South Burlington, VT (US); Herman Wiegman, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 18/139,743

(22) Filed: Apr. 26, 2023

(65) Prior Publication Data

US 2023/0257112 A1   Aug. 17, 2023

Related U.S. Application Data

(63) Continuation of application No. 17/852,309, filed on Jun. 28, 2022, now Pat. No. 11,667,377, which is a
(Continued)

(51) Int. Cl.
*B64C 27/26* (2006.01)
*B64C 9/02* (2006.01)
(Continued)

(52) U.S. Cl.
CPC ............... *B64C 27/26* (2013.01); *B64C 9/02* (2013.01); *B64D 27/24* (2013.01); *B64C 2027/8272* (2013.01); *B64C 2027/829* (2013.01)

(58) Field of Classification Search
CPC ... B64C 27/26; B64C 9/02; B64C 2027/8272; B64D 27/24; B64D 27/30
See application file for complete search history.

(56) References Cited

U.S. PATENT DOCUMENTS

| 6,542,077 B2 | 4/2003 | Joao |
| 7,058,484 B1 | 6/2006 | Potega |

(Continued)

FOREIGN PATENT DOCUMENTS

| CN | 108896916 A | 6/2021 |
| KR | 20130096443 A | 8/2013 |

(Continued)

OTHER PUBLICATIONS

Alnaqeb, et al., "Online Prediction of Battery Discharge and Flight Mission Assessment For Electrical Rotorcraft," 2018 AIAA Aerospace Sciences Meeting, 2018, 12 pages.
(Continued)

*Primary Examiner* — Rodney A Bonnette

(74) *Attorney, Agent, or Firm* — Lee & Hayes, P.C.; Patrick Nachtsheim

(57) ABSTRACT

In an aspect, a vertical take-off and landing (VTOL) aircraft is disclosed. The VTOL aircraft includes at least a lift component affixed to the aft end of a boom, wherein the lift component is configured to generate lift. The VTOL includes a fuselage comprising a fore end and an aft end. Additionally, VTOL aircraft includes a tail affixed to the aft end of a fuselage. A tail includes a plurality of vertically projecting elements, wherein the plurality vertically projecting elements are affixed at the aft end of the boom and positioned outside of the wake from the at least a lift component.

20 Claims, 4 Drawing Sheets

Related U.S. Application Data continuation-in-part of application No. 16/713,520, filed on Dec. 13, 2019, now Pat. No. 11,592,841, and a continuation of application No. 16/599,538, filed on Oct. 11, 2019.

(60) Provisional application No. 62/912,741, filed on Oct. 9, 2019, provisional application No. 62/812,215, filed on Feb. 28, 2019.

(51) Int. Cl.
*B64C 27/82* (2006.01)
*B64D 27/24* (2024.01)

(56) References Cited

U.S. PATENT DOCUMENTS

| | | | |
|---|---|---|---|
| 7,131,136 | B2 | 10/2006 | Monroe |
| 8,447,441 | B2 | 5/2013 | Calvignac et al. |
| 8,493,906 | B1 | 7/2013 | Troxel et al. |
| 8,515,656 | B2 | 8/2013 | Reed et al. |
| 8,527,240 | B2 | 9/2013 | Scheid et al. |
| 9,057,627 | B2 | 6/2015 | Shaw |
| 9,327,600 | B1 | 5/2016 | Nehmeh |
| 9,379,418 | B2 | 6/2016 | Wang et al. |
| 9,434,267 | B2 | 9/2016 | Wang et al. |
| 9,602,187 | B2 | 3/2017 | Jacobs et al. |
| 9,658,291 | B1 | 5/2017 | Wang et al. |
| 9,742,042 | B2 | 8/2017 | Wang et al. |
| 9,880,061 | B2 | 1/2018 | Wang et al. |
| 9,902,495 | B2 | 2/2018 | Phan et al. |
| 9,914,536 | B2 | 3/2018 | Rossotto |
| 10,322,814 | B1 * | 6/2019 | Tian .................. B64C 39/12 |
| D864,084 | S | 10/2019 | Clark |
| 11,827,346 | B1 * | 11/2023 | Clark .................. B64C 7/02 |
| 2011/0184590 | A1 | 7/2011 | Duggan et al. |
| 2013/0020429 | A1 | 1/2013 | Kroo |
| 2013/0317771 | A1 | 11/2013 | Laskowsky et al. |
| 2014/0032034 | A1 | 1/2014 | Raptopoulos et al. |
| 2014/0339891 | A1 | 11/2014 | Ohkawa et al. |
| 2016/0344208 | A1 | 11/2016 | Kawamura et al. |
| 2018/0039271 | A1 | 2/2018 | Rimoux et al. |
| 2018/0061247 | A1 | 3/2018 | Brown et al. |
| 2018/0208305 | A1 | 7/2018 | Lloyd et al. |
| 2018/0290735 | A1 * | 10/2018 | Uptigrove .......... B64C 29/0025 |
| 2018/0305005 | A1 * | 10/2018 | Parks .................. B64D 27/24 |
| 2019/0127056 | A1 | 5/2019 | Weekes et al. |
| 2020/0062383 | A1 | 2/2020 | Kim et al. |
| 2020/0079501 | A1 * | 3/2020 | Graves .................. B64U 50/19 |
| 2020/0254900 | A1 | 8/2020 | Kumar |
| 2021/0109547 | A1 | 4/2021 | Clark |
| 2021/0362848 | A1 | 11/2021 | Spencer |
| 2022/0009626 | A1 * | 1/2022 | Baharav .................. B64C 27/26 |

FOREIGN PATENT DOCUMENTS

| | | |
|---|---|---|
| WO | WO9626472 A1 | 8/1996 |
| WO | WO2015196259 A1 | 12/2015 |

OTHER PUBLICATIONS

Chi, et al., "Battery Charge Depletion Prediction on an Electric Aircraft," Annual Conference of the Prognostics and Health Management Society, Research Gate, Oct. 2013, 12 pages.

International Search Report and Written Opinion for International Application No. PCT/US2020/019969, mailed Jun. 22, 2020 pages.

Office Action for U.S. Appl. No. 16/599,358, mailed Oct. 31, 2022, 13 pages.

Office Action for U.S. Appl. No. 16/599,358, mailed Nov. 10, 2021, 16 pages.

Office Action for U.S. Appl. No. 17/852,309, mailed Nov. 14, 2022, 15 pages.

Office Action for U.S. Appl. No. 16/599,358, mailed Dec. 20, 2022, 13 pages.

Office Action for U.S. Appl. No. 16/599,358, mailed Feb. 27, 2024, 1 pages.

Office Action for U.S. Appl. No. 16/599,358, mailed Mar. 14, 2023, 13 pages.

Office Action for U.S. Appl. No. 16/599,358, mailed Mar. 15, 2022, 10 pages.

Office Action for U.S. Appl. No. 16/599,358, mailed Jun. 7, 2023, 15 pages.

Office Action for U.S. Appl. No. 16/599,358, mailed Jul. 1, 2022, 11 pages.

Office Action for U.S. Appl. No. 16/599,358, mailed Sep. 12, 2023, 16 pages.

Office Action for U.S. Appl. No. 17/852,309, maked Sep. 30, 2022, 15 pages.

* cited by examiner

VERTICAL TAKE-OFF AND LANDING (VTOL) AIRCRAFT

CROSS-REFERENCE TO RELATED APPLICATIONS

This application is a continuation of Non-provisional application Ser. No. 17/852,309 filed on Jun. 28, 2022, and entitled "A VERTICAL TAKE-OFF AND LANDING (VTOL) AIRCRAFT," which claims the benefit of priority to Non-provisional application Ser. No. 16/713,520 filed on Dec. 13, 2019, and entitled "IN-FLIGHT STABILIZATION OF AN AIRCRAFT," which claims priority to Provisional Application No. 62/912,741, filed on Oct. 9, 2019, and entitled "IN-FLIGHT STABILIZATION OF AN AIRCRAFT," each of which are incorporated by reference herein in their entirety. This application also claims the benefit of priority to Non-provisional application Ser. No. 16/599,538 filed on Oct. 11, 2019, and entitled "SYSTEMS AND METHODS FOR IN-FLIGHT OPERATIONAL ASSESSMENT," which claims the benefit of priority to Provisional Patent Application Ser. No. 62/812,215, filed on Feb. 28, 2019, and titled "METHODS AND SYSTEMS FOR IN-FLIGHT OPERATIONAL ASSESSMENT," both of which are incorporated by reference herein in their entirety.

FIELD OF THE INVENTION

The present invention generally relates to the field of aircrafts. In particular, the present invention is directed to vertical take-off and landing (VTOL) aircrafts.

BACKGROUND

In electrically propelled vehicles, such as an electric vertical takeoff and landing (VTOL) aircraft, it is essential to maintain the integrity of the aircraft until safe landing. Control surfaces are important to maintaining the integrity of the aircraft until safe landing because of their ability to adjust the attitude of the aircraft.

SUMMARY OF THE DISCLOSURE

In an aspect, a vertical take-off and landing (VTOL) aircraft is disclosed. The aircraft includes a plurality of lift components affixed to each boom of a plurality of booms. The aircraft includes a fuselage comprising a fore end and an aft end. The aircraft includes a tail affixed to the aft end of a fuselage. The tail includes a plurality of vertically projecting elements, wherein each vertically projecting element of the plurality of vertically projecting elements form an angle relative a longitudinal plane of the aircraft, wherein each vertically projecting element of the plurality of vertically projecting elements form a sweep angle relative a lateral plane of the aircraft. The plurality of vertically projecting elements additionally include a first vertically projecting element positioned to a first side of the fuselage and a second vertically projecting element positioned to a second side of the fuselage. The plurality of vertically projecting elements are positioned outside of the wake from the at least a lift component while the aircraft is engaged in conventional flight.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to a vertical take-off and landing (VTOL) aircraft. A VTOL aircraft may include at least a lift component affixed to the aft end of a boom, wherein the lift component is configured to generate lift. A VTOL may also include a fuselage comprising a fore end and an aft end Additionally, A VTOL aircraft may also include tail affixed to the aft end of a fuselage. A tail may include plurality of vertically projecting elements, wherein the plurality vertically projecting elements are affixed at the aft end of the boom and configuring the plurality of vertically projecting elements to be positioned outside of the wake from the at least a lift component.

Figure 1:
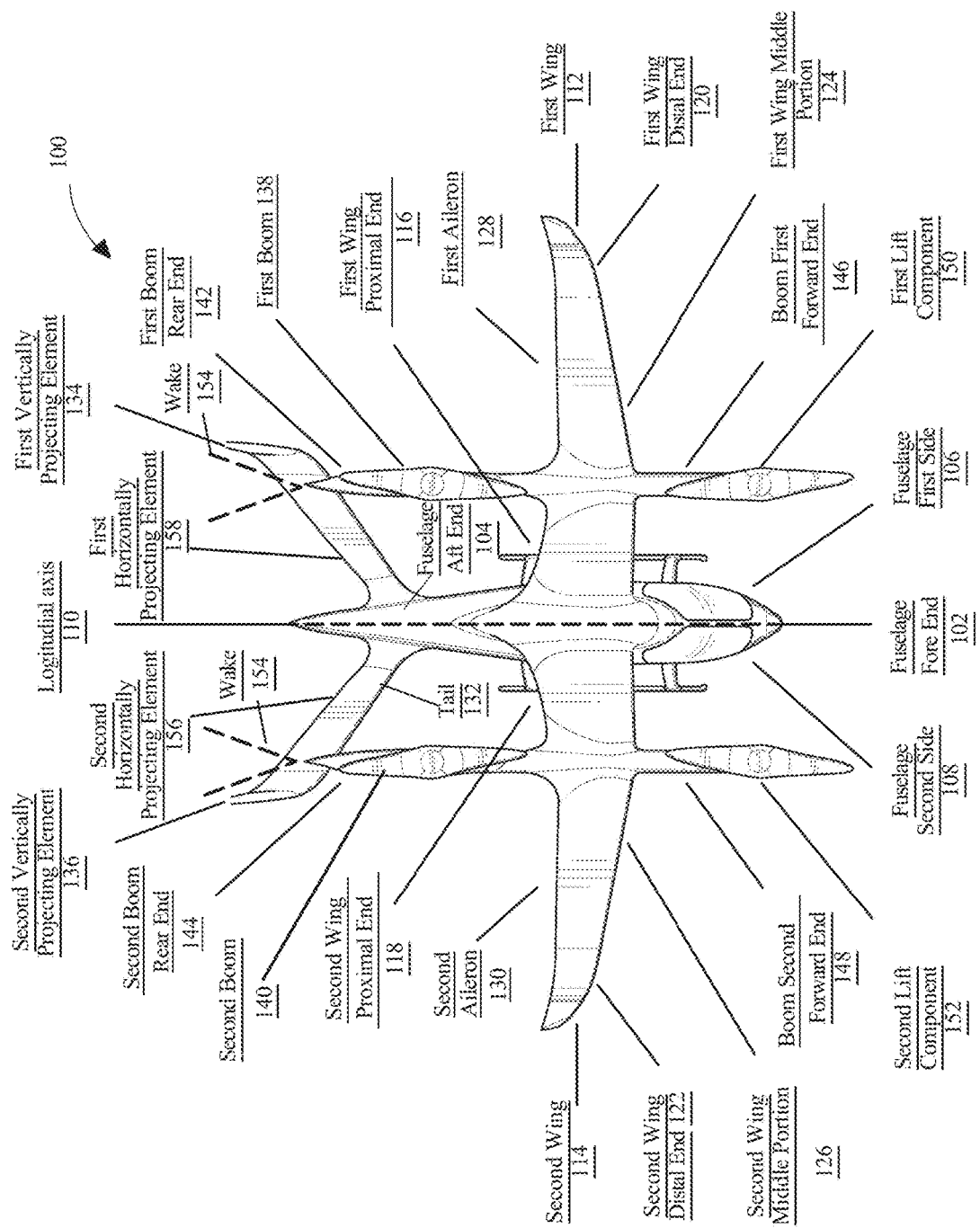
FIG. 1 is an aerial view of an exemplary embodiment of a VTOL aircraft.

Referring now to FIG. 1, an exemplary embodiment of aircraft 100 for a vertical take-off and landing is illustrated. System may include a computing device computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone computing device may include a single computing device operating independently, or may include two or more computing device operating in concert, in parallel, sequentially or the like; two or more computing devices may be included together in a single computing device or in two or more computing devices computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device computing device may include but is not limited to, for example, a computing device or cluster of computing devices in a first location and a second computing device or cluster of computing devices in a second location computing device may include one or more computing devices dedicated to data storage, security, distribution of traffic for load balancing, and the like computing device may distribute one or more computing tasks as described below across a plurality of computing devices of computing device, which may operate in parallel, in series, redundantly, or in any other manner used for distribution of tasks or memory between computing devices computing device may be implemented using a "shared nothing" architecture in which data is cached at the worker, in an embodiment, this may enable scalability of apparatus 100 and/or computing device.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference now to FIG. 1, an exemplary embodiment of aircraft 100 which may be used in conjunction with aircraft 100 of FIG. 1. For purposes of description herein, the terms "Proximal," "Distal," "Fore," "Aft," "Longitudinal Axis," "upper," "lower," "left," "rear," "right," "front," "vertical," "horizontal," "upward," "downward," "forward," "backward," and derivatives thereof shall relate to the orientation in FIG. 1. The above mentioned terms are defined herein below. As used in the current disclosure, "Proximal" is defined as situated nearer to the fuselage or the point of attachment. "Distal" is defined as situated away from the fuselage or from the point of attachment. "Fore" is defined as situated or placed in front with regard to the direction of flight when in fixed-wing flight. "Aft" is defined at, near, or toward the tail of an aircraft. "Longitudinal axis" is an axis that passes through the aircraft from nose to tail. For the purposes of the current disclosure, components that are designated as the "first" are located on the right side of the aircraft as the aircraft is oriented in FIG. 1. Components designated as the "second" are on the left side of the aircraft as the aircraft is oriented in FIG. 1. When describing the "right" and "left" in the current disclosure it is assumed that the aircraft in oriented in the manner that it oriented in FIG. 1.

Still referring now to FIG. 1, a VTOL aircraft may include a fuselage 102. Fuselage 102 includes a fore end 102 and an aft end 104. As described herein, the fore end 102 of the fuselage is in the front of the aircraft near the cockpit. The aft end 104 of a fuselage is opposite of the fore end with the longitudinal axis 110 running through the center of the aft end 104. The longitudinal axis 110 runs through the middle of the fuselage parallel with the first boom 138 and second booms 140. When the aircraft is oriented and viewed as depicted in FIG. 1, the entire right side of the fuselage is the first side 106, while the entire left side of the fuselage is the second side 108.

Still referring now to FIG. 1, a VTOL aircraft may include a plurality of fixed wings. As used in the current disclosure, a "fixed wing" is an element that projects essentially perpendicularly from the fuselage. Generally, fixed wings are designed in a manner where the air flows over them creating lift. When the aircraft is oriented as depicted in FIG. 1, the wing on the right side of the aircraft is the first wing 112 and the wing on the left side is the second wing 114. The first wing 112 and second wing 114 both include a first wing proximal end 116 and a second wing proximal end 118. The first and second proximal end 116/118 of the first and second wing 112/114 may be the portion of the wing nearest the fuselage as shown in FIG. 1. The first and second wing 112/114 both also include a first distal end 120 and second distal end 122. The distal end 120/122 of the first and second wing 112/114 may be the portion of the wing further away from the fuselage. The first middle portion 124 and second middle portion 126 of the first and second wing 112/114 is located in the area between the proximal end 116/118 and the distal end 120/122 near the connection of the booms. As used in the current disclosure, "middle portion" refers to the area of the fixed wing between the Distal end of the wing and the proximal end of the wing. The middle portion 124/126 of the first and second wing 112/114 may contain a first aileron 128 and a second aileron 130.

Still referring now to FIG. 1, a VTOL aircraft may include a tail 132. As used in the current disclosure, a "tail" is a structure at the rear of an aircraft that provides stability during flight. A tail 132 may also include a first and second vertically projecting elements 134/136. The tail 132 may be mechanically attached to the aft end of the fuselage 104. Tail 132 may include a first vertically projecting 134 element positioned to the first side of the fuselage 106. Additionally, tail 132 may include a second vertically projecting element 136 positioned to the second side of the fuselage 108. In an embodiment, a tail 132 may include a first and second horizontally projecting elements 158/156. A first and second horizontally projecting elements 158/156 may extend horizontally from the fuselage. A first and second horizontally projecting elements 158/156 may extend substantially horizontally from the fuselage. In some embodiments, a first and second horizontally projecting elements 158/156 may extend from the fuselage at an angle of 25-75 degrees with respect to a horizontal plane. In some embodiments, a first and second horizontally projecting elements 158/156 may extend from the fuselage at an angle of 35-60 degrees with respect to a horizontal plane. Tail 132 may include a first horizontally projecting 158 element positioned to the first side of the fuselage 106. Additionally, tail 132 may include a second horizontally projecting element 156 positioned to the second side of the fuselage 108. The horizontally projecting elements 158/156 may project outward and up from the fuselage as it is currently depicted in FIGS. 1 and 2. The horizontally projecting elements 158/156 may additionally be configured to be oriented at a sweep angle. Sweep angle for horizontally projecting elements 158/156 may be 5 to 50 degrees. Sweep angle for horizontally projecting elements 158/156 may be 10 to 45 degrees. Sweep angle for horizontally projecting elements 158/156 may be 15-30 degrees. The horizontally projecting elements 158/156 may be oriented in a manner to place both the vertically projecting elements 132/136 and the horizontally projecting elements 158/156 outside of the wake of the lift components. In some configurations, a the horizontally projecting elements 158/156 may be mechanically affixed to the booms rear ends 142/144. In some embodiments, the horizontally projecting elements 158/156 may be configured to be mechanically affixed to the vertically projecting elements 134/136. Additionally, the horizontally projecting elements 158/156 may be configured to be mechanically affixed to the vertically projecting elements 134/136. Horizontally projecting elements 158/156 may be connected at one end to fuselage aft end 104 and at a second end to a rudder as disclosed with reference to FIG. 2. In some embodiments, horizontally projecting elements 158/156 may be connected to fuselage aft end 104 and at a second end to a vertically projecting element 134/136.

Still referring now to FIG. 1 a VTOL aircraft may include a first boom 138 and a second boom 140. First and second boom 138/140 may be located near and/or affixed to the middle portion 126/124 of the first and second wing 114/112. First and second boom 138/140 may be parallel with each other and the longitudinal axis 110. First and second boom 138/140 may include a first rear end 142 and second rear end 144, respectively. A Boom first rear end 142 and Boom second rear end 144 may be affixed to the tail 132 near the aft end of the fuselage 104. Additionally, a boom first rear end 142 and Boom second rear end 144 may be affixed to a first and second vertically projecting elements 134/136 respectively. First and second boom 138/140 may also include a first forward end 146 and a second forward end 148. The first and second boom forward end 146/148 may be located substantially transverse from the fore end of the fuselage 102. In this case, the transverse direction is a direction extending at a right angle from the longitudinal axis 110. First boom 138 may be mechanically attached or affixed to the first wing 112. Second boom 140 may also be mechanically attached or affixed to the second wing 114. Additionally or alternatively, the structure of the VTOL aircraft may be consistent with the VTOL aircraft as described in U.S. Nonprovisional application Ser. No. 17/736,357, filed on May 4, 2022, and entitled "AN ELECTRIC AIRCRAFT," the entirety of which is incorporated herein by reference.

Still referring now to FIG. 1, a VTOL aircraft may include a plurality of lift components, wherein the plurality of lift components may include first lift component 150 and second lift component 152. A lift component may include a propulsor; for example, propulsor 212 as described in FIG. 2. First lift component 150 is mounted on the first boom respectively 138. While second lift component 152 may be mounted on the second boom 140.

Figure 2:
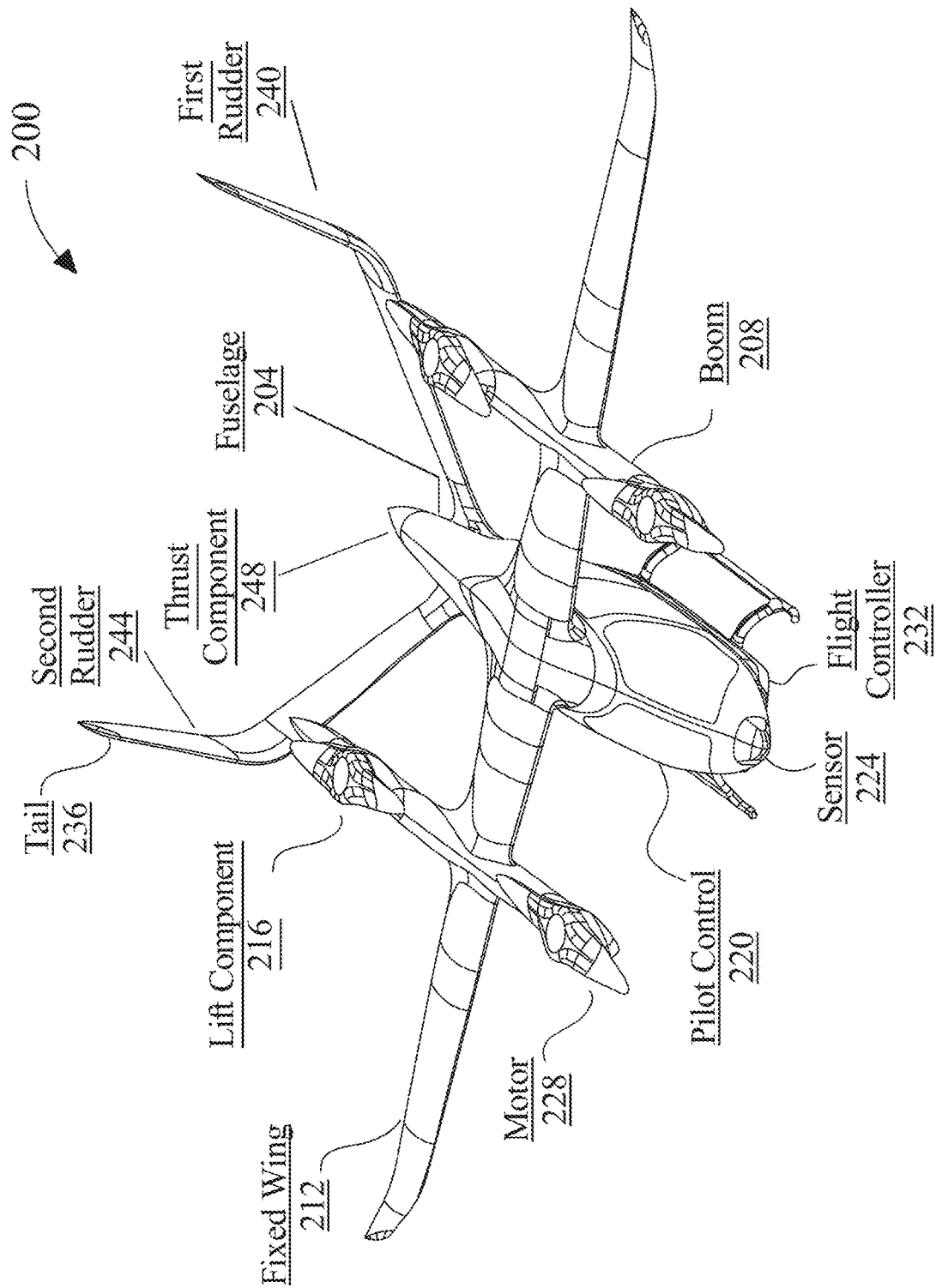
FIG. 2 is an isometric view of an exemplary embodiment of a VTOL aircraft.

Referring now to FIG. 2, an exemplary embodiment of an electric aircraft 200 is illustrated. Electric aircraft 200 may include an electrically powered aircraft. In some embodiments, electrically powered aircraft may be an electric vertical takeoff and landing (eVTOL) aircraft. Electric aircraft 200 may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight. Fixed-wing flight may also be referred to as conventional flight, these terms may be used interchangeably.

In an embodiment, and still referring to FIG. 2, electric aircraft 200 may include a fuselage 204. As used in this disclosure a "fuselage" is the main body of an aircraft, or in other words, the entirety of the aircraft except for the cockpit, nose, wings, boom, empennage, nacelles, any and all control surfaces, and generally contains an aircraft's payload. Fuselage 204 may comprise structural elements that physically support the shape and structure of an aircraft. Structural elements may take a plurality of forms, alone or in combination with other types. Structural elements may vary depending on the construction type of aircraft and specifically, the fuselage. Fuselage 204 may comprise a truss structure. A truss structure is often used with a lightweight aircraft and comprises welded steel tube trusses. A truss, as used herein, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later in this paper.

In embodiments, fuselage 204 may comprise geodesic construction. Geodesic structural elements may include stringers wound about formers (which may be alternatively called station frames) in opposing spiral directions. A stringer, as used herein, is a general structural element that comprises a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along the length of the interior of fuselage 204 orthogonal to the longitudinal (nose to tail) axis of the aircraft and forms the general shape of fuselage 204. A former may comprise differing cross-sectional shapes at differing locations along fuselage 204, as the former is the structural element that informs the overall shape of a fuselage 204 curvature. In embodiments, aircraft skin can be anchored to formers and strings such that the outer mold line of the volume encapsulated by the formers and stringers comprises the same shape as electric aircraft when installed. In other words, former(s) may form a fuselage's ribs, and the stringers may form the interstitials between such ribs. The spiral orientation of stringers about formers provides uniform robustness at any point on an aircraft fuselage such that if a portion sustains damage, another portion may remain largely unaffected. Aircraft skin would be mechanically coupled to underlying stringers and formers and may interact with a fluid, such as air, to generate lift and perform maneuvers.

In an embodiment, and still referring to FIG. 2, fuselage 204 may comprise monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, fuselage 204 may include a semi-monocoque construction. Semi-monocoque construction, as used herein, is a partial monocoque construction, wherein a monocoque construction is describe above detail. In semi-monocoque construction, fuselage 204 may derive some structural support from stressed aircraft skin and some structural support from underlying frame structure made of structural elements. Formers or station frames can be seen running transverse to the long axis of fuselage 204 with circular cutouts which are generally used in real-world manufacturing for weight savings and for the routing of electrical harnesses and other modern on-board systems. In a semi-monocoque construction, stringers are the thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate that there are numerous methods for mechanical fastening of the aforementioned components like crews, nails, dowels, pins, anchors, adhesives like glue or epoxy, or bolts and nuts, to name a few. A subset of fuselage under the umbrella of semi-monocoque construction is unibody vehicles. Unibody, which is short for "unitized body" or alternatively "unitary construction," vehicles are characterized by a construction in which the body, floor plan, and chassis form a single structure. In the aircraft world, unibody would comprise the internal structural elements like formers and stringers are constructed in one piece, integral to the aircraft skin as well as any floor construction like a deck.

Still referring to FIG. 2, stringers and formers which account for the bulk of any aircraft structure excluding monocoque construction can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. The location of said stringers greatly informs the type of forces and loads applied to each and every stringer, all of which may be handled by material selection, cross-sectional area, and mechanical coupling methods of each member. The same assessment may be made for formers. In general, formers are significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 2, stressed skin, when used in semi-monocoque construction is the concept where the skin of an aircraft bears partial, yet significant, load in the overall structural hierarchy. In other words, the internal structure, whether it be a frame of welded tubes, formers and stringers, or some combination, is not sufficiently strong enough by design to bear all loads. The concept of stressed skin is applied in monocoque and semi-monocoque construction methods of fuselage 204. Monocoque comprises only structural skin, and in that sense, aircraft skin undergoes stress by applied aerodynamic fluids imparted by the fluid. Stress as used in continuum mechanics can be described in pound-force per square inch ($lbf/in^2$) or Pascals (Pa). In semi-monocoque construction stressed skin bears part of the aerodynamic loads and additionally imparts force on the underlying structure of stringers and formers.

Still referring to FIG. 2, it should be noted that an illustrative embodiment is presented only, and this disclosure in no way limits the form or construction of electric aircraft. In embodiments, fuselage 204 may be configurable based on the needs of the electric per specific mission or objective. The general arrangement of components, structural elements, and hardware associated with storing and/or moving a payload may be added or removed from fuselage 204 as needed, whether it is stowed manually, automatedly, or removed by personnel altogether. Fuselage 204 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 204 may also be configurable to accept certain specific cargo containers, or a receptable that can, in turn, accept certain cargo containers.

Still referring to FIG. 2, electric aircraft may include a boom 208 or a plurality of booms 208 connected to Fixed wing 212. As used in this disclosure a "boom" is an element that projects essentially perpendicular from fixed-wing 212. Boom 208 may be mechanically affixed to tail 236 and/or first and second vertically projecting element. Additionally, a plurality of Lift components 216 and motors 228 may be mechanically affixed to Boom 208. In embodiments, a boom 208 may be a structural component. The plurality of Booms 208 may be mechanically attached to the first and second middle portion of the wing 122/124.

Still referring to FIG. 2, Fixed Wings 212 may be structures which include airfoils configured to create a pressure differential resulting in lift. Fixed Wings 212s may generally be disposed on the left first and second right sides of the aircraft symmetrically, at a point between nose and empennage. Fixed Wing 212s may comprise a plurality of geometries in planform view, swept swing, tapered, variable wing, triangular, oblong, elliptical, square, among others. A wing's cross section may geometry comprises an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. In an embodiment, and without limitation, fixed wing 212 may include a leading edge. As used in this disclosure a "leading edge" is a foremost edge of an airfoil that first intersects with the external medium. For example, and without limitation, leading edge may include one or more edges that may comprise one or more characteristics such as sweep, radius and/or stagnation point, droop, thermal effects, and the like thereof. In an embodiment, and without limitation, fixed wing 212 may include a trailing edge. As used in this disclosure a "trailing edge" is a rear edge of an airfoil. In an embodiment, and without limitation, trailing edge may include an edge capable of controlling the direction of the departing medium from the wing, such that a controlling force is exerted on the aircraft. Boom 208 may comprise differing and/or similar cross-sectional geometries over its cord length or the length from wing tip to where wing meets the aircraft's body. One or more fixed wing 212 may be symmetrical about the aircraft's longitudinal plane, which comprises the longitudinal or roll axis reaching down the center of the aircraft through the nose and empennage, and the plane's yaw axis. Boom may comprise controls surfaces configured to be commanded by a pilot or pilots to change a fixed wing's 212 geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

In an embodiment, and still referring to FIG. 1, a fixed wing 212 may include a plurality of control surfaces. As used in the current disclosure, "control surfaces" are aerodynamic devices attached to various points on an aircraft that allow a pilot to adjust and control the aircraft's flight attitude. Control surfaces may be configured to be commanded by a pilot or pilots to change a wing's geometry and therefore its interaction with a fluid medium, like air. In embodiments, control surfaces on a fixed-wing aircraft are attached to the airframe on hinges or tracks so they may move and thus deflect the air stream passing over them. This redirection of the air stream generates an unbalanced force to rotate the plane about the associated axis. There are three primary types of control surfaces an aileron, elevator/stabilator, and a rudder. Control surfaces may comprise flaps, ailerons, tabs, spoilers, and slats, among others. The control surfaces may be disposed on the wings and tail in a plurality of locations and arrangements and in embodiments may be disposed at the leading and trailing edges of the wings, and may be configured to deflect up, down, forward, aft, or a combination thereof. In other embodiments, control surfaces may be located on the tail of the aircraft primarily on the trailing edge.

Still referring to FIG. 2, control surfaces may include an aileron. As used in the current disclosure, an "Aileron" is a hinged flight control surface forming part of the trailing edge of each wing of aircraft. Ailerons are usually used in pairs (one on each wing) to control the aircraft in roll (or movement around the aircraft's longitudinal axis), which normally results in a change in flight path due to the tilting of the lift vector. Whenever lift is increased, induced drag is also increased. An aileron may include any control surface mentioned in the current disclosure.

Still referring to FIG. 2, control surfaces may include an elevator. As used in the current disclosure, an "elevator" is a moveable part of tail 236, usually hinged to the back of a horizontal component of tail 236. Use of elevators control the pitch axis of the aircraft. Aircraft 200 may include one or more elevators which move up and down together. In a non-limiting example, raised elevators cause a force that pushes down on the tail and causes the nose to pitch up. This may cause the fixed wings 212 to fly at a higher angle of attack, which may generate more lift and more drag.

Still referring to FIG. 2, control surfaces may include a rudder. As used in the current disclosure, a "rudder" is typically mounted on the trailing edge of the vertical stabilizer, part of the empennage. In a nonlimiting example, deflecting the rudder right pushes the tail left and causes the nose to yaw to the right. The reciprocal of the above mentioned example is also true. Centering the rudder pedals returns the rudder to neutral and stops the yaw Still referring to FIG. 2, electric aircraft may include a plurality of lift components 216 attached to boom 208. As used in this disclosure a "lift component" is a component and/or device used to propel a craft upward by exerting downward force on a fluid medium, which may include a gaseous medium such as air or a liquid medium such as water. Lift component 216 may include any device or component that consumes electrical power on demand to propel an electric aircraft in a direction or other vehicle while on ground or in-flight. For example, and without limitation, lift component 216 may include a rotor, propeller, paddle wheel, and the like thereof, wherein a rotor is a component that produces torque along a longitudinal axis, and a propeller produces torquer along a vertical axis. In an embodiment, lift component 216 may include a downward directed propulsor. In an embodiment, when a propulsor twists and pulls air behind it, it will, at the same time, push an aircraft forward with an equal amount of force. As a further non-limiting example, lift component 216 may include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like. The more air pulled behind an aircraft, the greater the force with which the aircraft is pushed forward. In some embodiments, the lift components 216 may include at least an electric motor, a propulsor assembly, and a motor nacelle. In some embodiments, the at least an electric motor and motor nacelle may be connected to boom 208. As a non-limiting example, the at least an electric motor and motor nacelle may be indirectly connected to boom 208.

In an embodiment, and still referring to FIG. 2, lift component 216 may include a plurality of blades. As used in this disclosure a "blade" is a propeller that converts rotary motion from an engine or other power source into a swirling slipstream. In an embodiment, blade may convert rotary motion to push the aircraft forwards or backwards if used in a thrust component and vertically if used in a lift component. In an embodiment lift component 216 may include a rotating power-driven hub, to which are attached several radial airfoil-section blades such that the whole assembly rotates about a longitudinal axis. The blades may be configured at an angle of attack. In an embodiment, and without limitation, angle of attack may include a fixed angle of attack. As used in this disclosure an "fixed angle of attack" is fixed angle between the chord line of the blade and the relative wind. As used in this disclosure a "fixed angle" is an angle that is secured and/or unmovable from the attachment point.

For example, and without limitation fixed angle of attack may be 2.8° as a function of a pitch angle of 8.1° and a relative wind angle 5.4°. In another embodiment, and without limitation, angle of attack may include a variable angle of attack. As used in this disclosure a "variable angle of attack" is a variable and/or moveable angle between the chord line of the blade and the relative wind. As used in this disclosure a "variable angle" is an angle that is moveable from the attachment point. For example, and without limitation variable angle of attack may be a first angle of 4.7° as a function of a pitch angle of 7.1° and a relative wind angle 2.4°, wherein the angle adjusts and/or shifts to a second angle of 2.7 as a function of a pitch angle of 5.1° and a relative wind angle 2.4°. In an embodiment, angle of attack be configured to produce a fixed pitch angle. As used in this disclosure a "fixed pitch angle" is a fixed angle between a cord line of a blade and the rotational velocity direction. For example, and without limitation, fixed pitch angle may include 18°. In another embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine the speed of the forward movement as the blade rotates.

In an embodiment, and still referring to FIG. 2, lift component 216 may be configured to produce a lift. As used in this disclosure a "lift" is a perpendicular force to the oncoming flow direction of fluid. For example, and without limitation relative air speed may be horizontal to electric aircraft, wherein the lift force may be a force exerted in the vertical direction, directing electric aircraft upwards. In an embodiment, and without limitation, lift component 216 may produce lift as a function of applying a torque to lift component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. In an embodiment, and without limitation, lift component 216 may receive a source of power and/or energy from a power sources may apply a torque on lift component 216 to produce lift. As used in this disclosure a "power source" is a source that that drives and/or controls any component attached to electric aircraft. For example, and without limitation power source may include a motor that operates to move one or more lift components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking.

Still referring to FIG. 2, power source may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which electric aircraft may be incorporated.

In an embodiment, and still referring to FIG. 2, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering, or other systems requiring power or energy. Further, the energy source may be capable of providing sufficient power for controlled descent and landing protocols, including, without limitation, hovering, descent, or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design.

Still referring to FIG. 2, an energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand.

Still referring to FIG. 2, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 2, another exemplary flight component may include landing gear. Landing gear may be used for take-off and/or landing. Landing gear may be used to contact ground while aircraft is not in flight.

Still referring to FIG. 2, in an embodiment, aircraft 200 may include a pilot control 220. As used in this disclosure, a "pilot control" is a mechanism or means which allows a pilot to monitor and control operation of aircraft such as its flight components (for example, and without limitation, pusher component, lift component and other components such as propulsion components). For example, and without limitation, pilot control 220 may include a collective, inceptor, foot bake, steering and/or control wheel, control stick, pedals, throttle levers, and the like. Pilot control 220 may be configured to translate a pilot's desired torque for each flight component of the plurality of flight components, such as and without limitation, pusher component and lift component 216. Pilot control 220 may be configured to control, via inputs and/or signals such as from a pilot, the pitch, roll, and yaw of the aircraft. Pilot control may be available onboard aircraft or remotely located from it, as needed or desired.

Still referring to FIG. 2, as used in this disclosure a "collective control" or "collective" is a mechanical control of an aircraft that allows a pilot to adjust and/or control the pitch angle of plurality of flight components 208. For example and without limitation, collective control may alter and/or adjust the pitch angle of all of the main rotor blades collectively. For example, and without limitation pilot control 220 may include a yoke control. As used in this disclosure a "yoke control" is a mechanical control of an aircraft to control the pitch and/or roll. For example and without limitation, yoke control may alter and/or adjust the roll angle of aircraft 200 as a function of controlling and/or maneuvering ailerons. In an embodiment, pilot control 220 may include one or more foot-brakes, control sticks, pedals, throttle levels, and the like thereof. In another embodiment, and without limitation, pilot control 220 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of aircraft, perpendicular to the wings. For example, and without limitation, a positive yawing motion may include adjusting and/or shifting nose of aircraft 200 to the right. Principal axis may include a pitch axis. As used in this disclosure a "pitch axis" is an axis that is directed towards the right laterally extending wing of aircraft. For example, and without limitation, a positive pitching motion may include adjusting and/or shifting nose of aircraft 200 upwards. Principal axis may include a roll axis. As used in this disclosure a "roll axis" is an axis that is directed longitudinally towards nose of aircraft, parallel to fuselage. For example, and without limitation, a positive rolling motion may include lifting the left and lowering the right wing concurrently. Pilot control 220 may be configured to modify a variable pitch angle. For example, and without limitation, pilot control 220 may adjust one or more angles of attack of a propulsor or propeller.

Still referring to FIG. 2, aircraft 200 may include at least an aircraft sensor 224. Aircraft sensor 224 may include any sensor or noise monitoring circuit described in this disclosure. Aircraft sensor 224, in some embodiments, may be communicatively connected or coupled to Flight controller. Aircraft sensor 224 may be configured to sense a characteristic of pilot control 220. Sensor may be a device, module, and/or subsystem, utilizing any hardware, software, and/or any combination thereof to sense a characteristic and/or changes thereof, in an instant environment, for instance without limitation a pilot control 220, which the sensor is proximal to or otherwise in a sensed communication with, and transmit information associated with the characteristic, for instance without limitation digitized data. Sensor 224 may be mechanically and/or communicatively coupled to aircraft 200, including, for instance, to at least a pilot control 220. Aircraft sensor 224 may be configured to sense a characteristic associated with at least a pilot control 220. An environmental sensor may include without limitation one or more sensors used to detect ambient temperature, barometric pressure, and/or air velocity. Aircraft sensor 224 may include without limitation gyroscopes, accelerometers, inertial measurement unit (IMU), and/or magnetic sensors, one or more humidity sensors, one or more oxygen sensors, or the like. Additionally or alternatively, sensor 224 may include at least a geospatial sensor. Aircraft sensor 224 may be located inside aircraft, and/or be included in and/or attached to at least a portion of aircraft. Sensor may include one or more proximity sensors, displacement sensors, vibration sensors, and the like thereof. Sensor may be used to monitor the status of aircraft 200 for both critical and non-critical functions. Sensor may be incorporated into vehicle or aircraft or be remote.

Still referring to FIG. 2, in some embodiments, aircraft sensor 224 may be configured to sense a characteristic associated with any pilot control described in this disclosure. Non-limiting examples of aircraft sensor 224 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, aircraft sensor 224 may sense a characteristic as an analog measurement, for instance, yielding a continuously variable electrical potential indicative of the sensed characteristic. In these cases, aircraft sensor 224 may additionally comprise an analog to digital converter (ADC) as well as any additionally circuitry, such as without limitation a Wheatstone bridge, an amplifier, a filter, and the like. For instance, in some cases, aircraft sensor 224 may comprise a strain gage configured to determine loading of one or more aircraft components, for instance landing gear. Strain gage may be included within a circuit comprising a Wheatstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 200, for instance without limitation a computing system, a pilot display, and a memory component. Alternatively or additionally, aircraft sensor 224 may sense a characteristic of a pilot control 220 digitally. For instance in some embodiments, aircraft sensor 224 may sense a characteristic through a digital means or digitize a sensed signal natively. In some cases, for example, aircraft sensor 224 may include a rotational encoder and be configured to sense a rotational position of a pilot control; in this case, the rotational encoder digitally may sense rotational "clicks" by any known method, such as without limitation magnetically, optically, and the like. Aircraft sensor 224 may include any of the sensors as disclosed in the present disclosure. Aircraft sensor 224 may include a plurality of sensors. Any of these sensors may be located at any suitable position in or on aircraft 200.

Still referring to FIG. 2, aircraft 200 may include at least a motor 228, which may be mounted on a structural feature of the aircraft. Design of motor 228 may enable it to be installed external to structural member (such as a boom, nacelle, or fuselage) for easy maintenance access and to minimize accessibility requirements for the structure; this may improve structural efficiency by requiring fewer large holes in the mounting area. In some embodiments, motor 228 may include two main holes in top and bottom of mounting area to access bearing cartridge. Further, a structural feature may include a component of electric aircraft 200. For example, and without limitation structural feature may be any portion of a vehicle incorporating motor 228, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque, or shear stresses imposed by at least lift component. Persons skilled in the art, upon reviewing the entirety of this disclosure, will be aware of various materials, combinations of materials, and/or constructions techniques.

With continued reference to FIG. 2, aircraft 200 may include a motor nacelle. Motor nacelle surrounds the at least an electric motor. In an embodiment, motor nacelle may surround motor 228. For the purposes of this disclosure, "motor nacelle" refers to a streamlined enclosure that houses an aircraft motor. In some embodiments, motor nacelle may be located on the wing or boom of an aircraft. In some other embodiments, motor nacelle may be part of an aircraft tail cone. A "tail cone," for the purposes of this disclosure, refers to the conical section at the tail end of an aircraft.

Still referring to FIG. 2, electric aircraft 200 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors.

With continued reference to FIG. 2, a number of aerodynamic forces may act upon the electric aircraft during flight. Forces acting on electric aircraft 200 during flight may include, without limitation, thrust, the forward force produced by the rotating element of the electric aircraft and acts parallel to the longitudinal axis. Another force acting upon electric aircraft 200 may be, without limitation, drag, which may be defined as a rearward retarding force which is caused by disruption of airflow by any protruding surface of the electric aircraft 200 such as, without limitation, the wing, rotor, and fuselage. Drag may oppose thrust and acts rearward parallel to the relative wind. A further force acting upon electric aircraft 200 may include, without limitation, weight, which may include a combined load of the electric aircraft 200 itself, crew, baggage, and/or fuel. Weight may pull electric aircraft 200 downward due to the force of gravity. An additional force acting on electric aircraft 200 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 200 are designed to be as lightweight as possible. Reducing the weight of the aircraft and designing to reduce the number of components is essential to optimize the weight. To save energy, it may be useful to reduce weight of components of electric aircraft 200, including without limitation propulsors and/or propulsion assemblies. In an embodiment, motor 228 may eliminate need for many external structural features that otherwise might be needed to join one component to another component. Motor 228 may also increase energy efficiency by enabling a lower physical propulsor profile, reducing drag and/or wind resistance. This may also increase durability by lessening the extent to which drag and/or wind resistance add to forces acting on electric aircraft 200 and/or propulsors.

Still referring to FIG. 2, electric aircraft may include at least a thrust component. In some embodiments, thrust component may be integrated with the tail cone of aircraft 200. As used in this disclosure a "thrust component" is a flight component that is mounted such that the component thrusts the flight component through a medium. As a non-limiting example, thrust component may include a pusher flight component such as a pusher propeller, a pusher motor, a pusher propulsor, and the like. As used in the current disclosure, a "pusher flight component" is a thrust component configured to push the aircraft through the medium. Additionally, or alternatively, pusher flight component may include a plurality of pusher flight components. As a further non-limiting example, thrust flight may include a puller flight component such as a puller propeller, a puller motor, a puller propulsor, and the like. As used in the current disclosure, a "puller flight component" is a thrust component configured to pull the aircraft through the medium. Additionally, or alternatively, puller flight component may include a plurality of puller flight component With continued reference to FIG. 2, in some embodiments, electric aircraft 200 includes, or may be coupled to or communicatively connected to, flight controller 232 which is described further with reference to FIG. 3. As used in this disclosure a "flight controller" is a computing device of a plurality of computing devices dedicated to data storage, security, distribution of traffic for load balancing, and flight instruction. In embodiments, flight controller 232 may be installed in an aircraft, may control the aircraft remotely, and/or may include an element installed in the aircraft and a remote element in communication therewith. Flight controller 232, in an embodiment, is located within fuselage 204 of aircraft. In accordance with some embodiments, flight controller 232 is configured to operate a vertical lift flight (upwards or downwards, that is, takeoff or landing), a fixed wing flight (forward or backwards), a transition between a vertical lift flight and a fixed wing flight, and a combination of a vertical lift flight and a fixed wing flight. In an embodiment, flight controller 232 may be configured to control a plurality of lift components and thrust components. Flight controller 232 may be configured to turn off lift propulsor and turn on thrust component for fixed wing based flight. In other embodiments, flight controller 232 may be configured to select between hover based landing and a gliding landing.

Still referring to FIG. 2, in an embodiment, and without limitation, Flight controller 232 may be configured to operate a fixed-wing flight capability. Flight controller 232 may operate the fixed-wing flight capability as a function of reducing applied torque on lift (propulsor) component 216. In an embodiment, and without limitation, an amount of lift generation may be related to an amount of forward thrust generated to increase airspeed velocity, wherein the amount of lift generation may be directly proportional to the amount of forward thrust produced. Additionally or alternatively, flight controller may include an inertia compensator. As used in this disclosure an "inertia compensator" is one or more computing devices, electrical components, logic circuits, processors, and the like there of that are configured to compensate for inertia in one or more lift (propulsor) components present in aircraft 100. Inertia compensator may alternatively or additionally include any computing device used as an inertia compensator as described in U.S. Nonprovisional application Ser. No. 17/106,557, filed on Nov. 30, 2020, and entitled "SYSTEM AND METHOD FOR FLIGHT CONTROL IN ELECTRIC AIRCRAFT," the entirety of which is incorporated herein by reference. Flight controller may efficaciously include any flight controllers as disclosed in U.S. Nonprovisional application Ser. No. 17/106,557, filed on Nov. 30, 2020, and entitled "SYSTEM AND METHOD FOR FLIGHT CONTROL IN ELECTRIC AIRCRAFT."

In an embodiment, and still referring to FIG. 2, Flight controller 232 may be configured to perform a reverse thrust command. As used in this disclosure a "reverse thrust command" is a command to perform a thrust that forces a medium towards the relative air opposing aircraft 100. Reverse thrust command may alternatively or additionally include any reverse thrust command as described in U.S. Nonprovisional application Ser. No. 17/319,155, filed on May 13, 2021, and entitled "AIRCRAFT HAVING REVERSE THRUST CAPABILITIES," the entirety of which is incorporated herein by reference. In another embodiment, flight controller 232 may be configured to perform a regenerative drag operation. As used in this disclosure a "regenerative drag operation" is an operating condition of an aircraft, wherein the aircraft has a negative thrust and/or is reducing in airspeed velocity. For example, and without limitation, regenerative drag operation may include a positive propeller speed and a negative propeller thrust. Regenerative drag operation may alternatively or additionally include any regenerative drag operation as described in U.S. Nonprovisional application Ser. No. 17/319,155. Flight controller may efficaciously include any flight controllers as disclosed in U.S. Nonprovisional application Ser. No. 17/319,155, filed on May 13, 2021, and entitled "AIRCRAFT HAVING REVERSE THRUST CAPABILITIES,".

In an embodiment, and still referring to FIG. 2, Flight controller 232 may be configured to perform a corrective action as a function of a failure event. As used in this disclosure a "corrective action" is an action conducted by the plurality of flight components to correct and/or alter a movement of an aircraft. For example, and without limitation, a corrective action may include an action to reduce a yaw torque generated by a failure event. Additionally or alternatively, corrective action may include any corrective action as described in U.S. Nonprovisional application Ser. No. 17/222,539, filed on Apr. 5, 2021, and entitled "AIRCRAFT FOR SELF-NEUTRALIZING FLIGHT," the entirety of which is incorporated herein by reference. As used in this disclosure a "failure event" is a failure of a lift component of the plurality of lift components. For example, and without limitation, a failure event may denote a rotation degradation of a rotor, a reduced torque of a rotor, and the like thereof. Additionally or alternatively, failure event may include any failure event as described in U.S. Nonprovisional application Ser. No. 17/113,647, filed on Dec. 7, 2020, and entitled "IN-FLIGHT STABILIZATION OF AN AIRCRAFT," the entirety of which is incorporated herein by reference. Flight controller may efficaciously include any flight controllers as disclosed in U.S. Nonprovisional App. Ser. Nos. 17/222,539 and 17/113,647.

Still referring to FIG. 2, thrust component 248 may produce torque along a longitudinal axis, or a lift component 216 may produces a torque along a vertical axis. For example, and without limitation, torque may rotate an aileron and/or rudder to generate a force that may adjust and/or affect altitude, airspeed velocity, groundspeed velocity, direction during flight, and/or thrust. In an embodiment, and without limitation, lift component 216 may receive a source of power and/or energy from a power sources may apply a torque on lift component 216 to produce lift.

In an embodiment, and still referring to FIG. 2, system 200 may contain movement resisting elements. As used in the current disclosure, "movement resisting elements" may be any apparatus or procedure that is used to cancel the cancel the effect of torque and/or moment on the aircraft. In an embodiment, movement resisting elements cancel out the torque and/or moment created by lift elements as a function of movement datum. Examples of movement resisting elements may include offsetting the angle of the lift component by a torque cancellation angle while alternating the rotation of the various propellors. This will be discussed in more detail below.

Still referring to FIG. 2, A nonlimiting example of a movement resisting element is placing rotational axis of the lift element/propulsors offset from a vertical axis. As used in this disclosure a "rotational axis" is circular movement of a propeller about a vertical axis. For example, a propeller may revolve around a shaft, wherein the shaft is oriented along the vertical axis. In an embodiment a propeller may convert rotary motion from an engine or other power source into a swirling slipstream which pushes the propeller forwards or backwards. Propulsor may include a rotating power-driven hub, to which are attached several radial airfoil-section blades such that the whole assembly rotates about a longitudinal axis. As a non-limiting example, the blade pitch of the propellers may be fixed, manually variable to a few set positions, automatically variable (e.g. a "constant-speed" type), and/or any combination thereof. In an embodiment, propellers for an aircraft are designed to be fixed to their hub at an angle similar to the thread on a screw makes an angle to the shaft; this angle may be referred to as a pitch or pitch angle which will determine the speed of the forward movement as the blade rotates. Additionally or alternatively, lift component has a rotational axis offset from a vertical axis by torque-cancellation angle. As used in this disclosure a "torque-cancellation angle" is an angle at which one or more propulsors are oriented about the vertical axis to reduce and/or eliminate a yaw torque. As used in this disclosure a "yaw torque" is a torque exerted along the vertical axis of an aircraft, wherein the vertical axis has its origin at the center of gravity and is directed towards the bottom of the aircraft, perpendicular to the wings and to the fuselage reference line. As a non-limiting example a yaw torque directing the nose of an aircraft to the right of the vertical axis may be generated due to a rudder movement and/or shifting.

In an embodiment, and still referring to FIG. 2, torque-cancellation angle may include a nominal angle. As used in this disclosure a "nominal angle" is an angle of the propulsor in a horizontal axis. For example, and without limitation, a nominal angle may include a 3° angle tilted forward and/or a 3° angle tilted backward. Additionally or alternatively, torque-cancellation angle may include a canted angle. As used in this disclosure a "canted angle" is an angle of the propulsor in longitudinal direction. For example, and without limitation, a nominal angle may include a 5.5° angle tilted inward and/or a 5.5° angle tilted outward. In an embodiment, and without limitation, the plurality of lift component 216 may be attached to fuselage 204 at a yaw-torque-cancellation angle that is a fixed angle. As used in this disclosure a "fixed angle" is an angle that is secured and/or unmovable from the attachment point. For example, and without limitation, a fixed angle may be an angle of 3.4° inward and/or 5.2° forward. As a further non-limiting example, a fixed angle may be an angle of 3 inward and/or 0.6° forward. In an embodiment the fixed angle may include the respective yaw-cancellation. For example, and without limitation, plurality of lift component 216. may include a first lift component having a first yaw-torque-cancellation angle with respect to the vertical axis and a second lift component having a second yaw-cancelation angle with respect to the vertical axis. Additionally or alternatively, a first lift component may be moveable to the yaw-torque-cancellation angle as a function of an actuator, wherein an actuator is described in detail below. For example, and without limitation a first lift component may be angled at a first angle, wherein an actuator may rotate and/or shift the first lift component to a yaw-torque-cancellation angle.

Still referring to FIG. 2, an exemplary embodiment of a system for a structure of an electric aircraft is illustrated. System includes a flight controller 232. flight controller 232 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. flight controller 232 may include a single computing device operating independently, or may include two or more computing device operating in concert, in parallel, sequentially or the like; two or more computing devices may be included together in a single computing device or in two or more computing devices. flight controller 232 may interface or communicate with one or more additional devices as described below in further detail via a network interface device. Network interface device may be utilized for connecting flight controller 232 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. flight controller 232 may include but is not limited to, for example, a computing device or cluster of computing devices in a first location and a second computing device or cluster of computing devices in a second location. flight controller 232 may include one or more computing devices dedicated to data storage, security, distribution of traffic for load balancing, and the like. flight controller 232 may distribute one or more computing tasks as described below across a plurality of computing devices of computing device, which may operate in parallel, in series, redundantly, or in any other manner used for distribution of tasks or memory between computing devices. flight controller 232 may be implemented using a "shared nothing" architecture in which data is cached at the worker, in an embodiment, this may enable scalability of system 200 and/or computing device.

With continued reference to FIG. 2, flight controller 232 may be designed and/or configured to perform any method, method step, or sequence of method steps in any embodiment described in this disclosure, in any order and with any degree of repetition. For instance, flight controller 232 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. flight controller 232 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In an embodiment, and still referring to FIG. 2, aircraft 200 may include at least an actuator configured to move each propulsor of the plurality of lift component 216. As used in this disclosure an "actuator" is a motor that may adjust an angle and/or position of a the lift component. For example, and without limitation an actuator may adjust rotor 4° in the horizontal axis. As a further non, limiting example, an actuator may adjust an a propulsor from a first vertically aligned angle to a yaw-torque-cancellation angle. For example, lift component 216 may be attached to fuselage 204 at a first vertical axis, wherein the first vertical axis may include a 3° inward and/or 1.4° forward wherein an actuator motor may maneuver and/or shift the lift component +/−15° in the horizontal and/or longitudinal axis. In an embodiment, and without limitation, actuator may be commanded as a function of a flight controller 232. As used in this disclosure a "flight controller" is a computing device of a plurality of computing devices dedicated to data storage, security, distribution of traffic for load balancing, and flight instruction. Flight controller 232 may include and/or communicate with any computing device as described in this disclosure, including without limitation a microcontroller, microprocessor, digital signal processor (DSP) and/or system on a chip (SoC) as described in this disclosure. Further, flight controller 232 may include a single computing device operating independently, or may include two or more computing device operating in concert, in parallel, sequentially or the like; two or more computing devices may be included together in a single computing device or in two or more computing devices. In embodiments, flight controller 232 may be installed in an aircraft, may control the aircraft remotely, and/or may include an element installed in the aircraft and a remote element in communication therewith.

In an embodiment, and still referring to FIG. 2, flight controller 232 may include a reconfigurable hardware platform. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform may be reconfigured to enact any algorithm and/or algorithm selection process received from another computing device and/or created using machine-learning and/or neural net processes as described below.

Still referring to FIG. 2, aircraft 200 may include a tail 236 that is mechanically connected to both the boom and the fuselage. As used in the current disclosure, a "tail" is a structure at the rear of an aircraft that provides stability during flight. In embodiments, the tail 236 may include an empennage which is a device that incorporates vertical and horizontal stabilizing surfaces which stabilize the flight dynamics of yaw and pitch, as well as housing control surfaces. Structurally, the empennage consists of the entire tail 236 assembly, including the tailfin, the tailplane, and the part of the fuselage to which these are attached. Tail 236 may include both the First and second of vertically projecting elements 136/134 of FIG. 1. The front section of the tailplane is called the horizontal stabilizer and is used to provide pitch stability. In embodiments the horizontal stabilizer may contain a control surface such as a rudder. The rear section of the tailplane is called the elevator and is a movable airfoil that controls changes in pitch, the up-and-down motion of the aircraft's nose. In some aircraft the horizontal stabilizer and elevator are one unit, and to control pitch the entire unit moves as one. This is known as a stabilator or full-flying stabilizer. The vertical tail 236 structure has a fixed front section called the vertical stabilizer, used to control yaw, which is movement of the fuselage right to left motion of the nose of the aircraft. The rear section of the vertical fin is the rudder, a movable airfoil that is used to turn the aircraft's nose right or left. When used in combination with the ailerons, the result is a banking turn, a coordinated turn, the essential feature of aircraft movement.

Still referring to FIG. 2, stabilizing surfaces of tail 236 may be configured to be positioned in a V-shaped formation on the aft end of the fuselage 104. In embodiments, arrangement of the tail 236 control surfaces that replaces the traditional fin and horizontal surfaces with A first and second vertically projecting elements 134/136 set in a V-shaped configuration. In embodiments, the first vertically projecting element 134 of the V formation may be projecting from the first side of the fuselage 106. The second vertically projecting element 136 of the V formation is projecting from on the second side fuselage 108. The first side vertically projecting element 134 may be the right side of tail as the aircraft is oriented in FIG. 1. Whereas the second side vertically projecting element 136 may be the left side of tail as the aircraft is oriented in FIG. 1. The combination of these projections should make a V like shape. The structures in the V shaped formation may be positioned closer to the horizontal axis while still on either the first or the second side 106/108 of the fuselage 204. The V-shaped structures could be positioned such that the first side 106 is laterally between it and the longitudinal axis 110, where a given point is "laterally between" means if a line is drawn parallel to the longitudinal axis that passes through that point, the line will pass between the object and the longitudinal axis. The entire fuselage 204 is laterally between if the point of the fuselage farthest from the longitudinal axis 110 is laterally between. The V-shaped configuration of tail 236 may additionally include vertical stabilizers above the V-shaped portion. Control surfaces may be located at any location on tail 236. Rudders may be located on the vertical portion of the V shaped configuration. A first rudder 240 may be located on first vertically projecting element 134. A second rudder 244 may be located on the second vertically projecting element 136. First and second rudders 240/244 may be comprised of a plurality of rudders. The tail 236 may be made of the same materials as the fixed wings. In embodiments, the boom's first rear end 142 structure may be mechanically affixed to the tail 236 at the first side of the V-formation. The Boom's second rear end structure 144 may be mechanically affixed to the tail 236 at the second side of the V-formation.

Still referring to FIG. 2, the plurality of vertically projecting elements of tail 236 may be configured to be positioned in a V-shaped formation. The angle of the V-shaped formation may be evaluated at an angle relative a longitudinal/roll axis of the aircraft. The angle of each of the vertically projecting elements may be represented by the angle between the longitudinal/roll axis of the aircraft and the vertically projecting element. When the pair of vertically projecting elements are placed on the first and the second side of the fuselage respectively at an angle relative a longitudinal/roll axis, the vertically projecting elements will be in a V-shaped formation.

Still referring to FIG. 2, the plurality of vertically projecting elements of tail 236 may be configured to be at a sweep angle relative a lateral plane of the aircraft. As used in the current disclosure, a "sweep angle" is an angle that angles towards the aft end of the fuselage from the base of the tail. In embodiments, sweep angles vary from 0 to 45 degrees. For high-speed designs, the sweep angle may be more than 45 degrees. The sweep angle can clearly be seen in FIG. 1, with reference to the first and second vertically projecting elements 136/134. The plurality of vertically projecting elements Returning to FIG. 1, first and second vertically projecting elements 134/136 may be positioned outside the wake 154 of a lift component 216. As used in the current disclosure, a "wake" is the region of recirculating flow behind a lift component 216. A wake 154 may be generated while the aircraft is engaged in fixed wing flight. Wake 154 may also be the region of a decelerated fluid (air) that arises behind the body around which the fluid flows and extends for some distance. The wake 154 emanates from both lift components 216 and generally gradually extends in a cone shaped formation. A first and second vertically projecting elements 134/136 may be configured to be outside of the wake 154 distally as it relates to the lift components 216. In other words, each of a first and second vertically projecting elements 134/136 may be configured to avoid the wake entirely by being positioned outside of the wake distally as it relates to the distal end of fixed wing 212 or boom 208. In embodiments, the propellors of lift component 216 may be configured to be parallel with the boom in order to create a narrower wake 154.

Returning to FIG. 2, thrust component 248 may include a pusher propeller, a paddle wheel, a pusher motor, a pusher propulsor, and the like. Thrust component 248 may be primarily used in fixed wing based flight. Thrust component 248 may be located at the rear end of fuselage 204. Additionally, or alternatively, thrust component 248 may include a plurality of pusher flight components. Thrust component 248 is configured to produce a forward thrust. As a non-limiting example, forward thrust may include a force to force aircraft to in a horizontal direction along the longitudinal axis. As a further non-limiting example, thrust component 248 may twist and/or rotate to pull air behind it and, at the same time, push aircraft 200 forward with an equal amount of force. In an embodiment, and without limitation, the more air forced behind aircraft, the greater the thrust force with which the aircraft is pushed horizontally will be. In another embodiment, and without limitation, forward thrust may force aircraft 200 through the medium of relative air. Additionally or alternatively, plurality of flight components may include one or more puller components. As a non-limiting example, puller component may include a flight component such as a puller propeller, a puller motor, a tractor propeller, a puller propulsor, and the like. Additionally, or alternatively, puller component may include a plurality of puller flight components.

Still referring to FIG. 2, thrust component 248 may include a thrust element which may be integrated into the propulsor. Thrust component 248 may include, without limitation, a device using moving or rotating foils, such as one or more rotors, an airscrew or propeller, a set of airscrews or propellers such as contra-rotating propellers, a moving or flapping wing, or the like. Further, a Thrust component 248, for example, can include without limitation a marine propeller or screw, an impeller, a turbine, a pump-jet, a paddle or paddle-based device, or the like.

Still referring to FIG. 2, in some embodiments the tail 236 of the aircraft may contains a tail rotor on the aft end of the fuselage 204. As used in this disclosure a "tail rotor" is a smaller rotor mounted vertically and/or near-vertically at aft end of the fuselage 204. Tail rotor may rotate to generate a yaw thrust in the same direction as the main rotor's rotation. Tail rotor may be positioned at a distance from the aircrafts center of mass to allow for enough thrust and/or torque to rotate the aircraft in the yaw direction. Tail rotor may include an adjustable pitch. As used in this disclosure an "adjustable pitch" is a pitch of the tail rotor blades that may be varied to provide directional control of the tail rotor in the yaw axis. For example, and without limitation, the tail rotor may rotate an aircraft 3° in the positive direction of the yaw axis to maintain a flight path. In an embodiment, and without limitation, the tail rotor may be composed of a core made of aluminum honeycomb and/or plasticized paper honeycomb, covered in a skin made of aluminum, carbon fiber composite, and/or titanium. Tail rotor may be fixed and/or adjustable as a function of an actuator motor.

Figure 3:
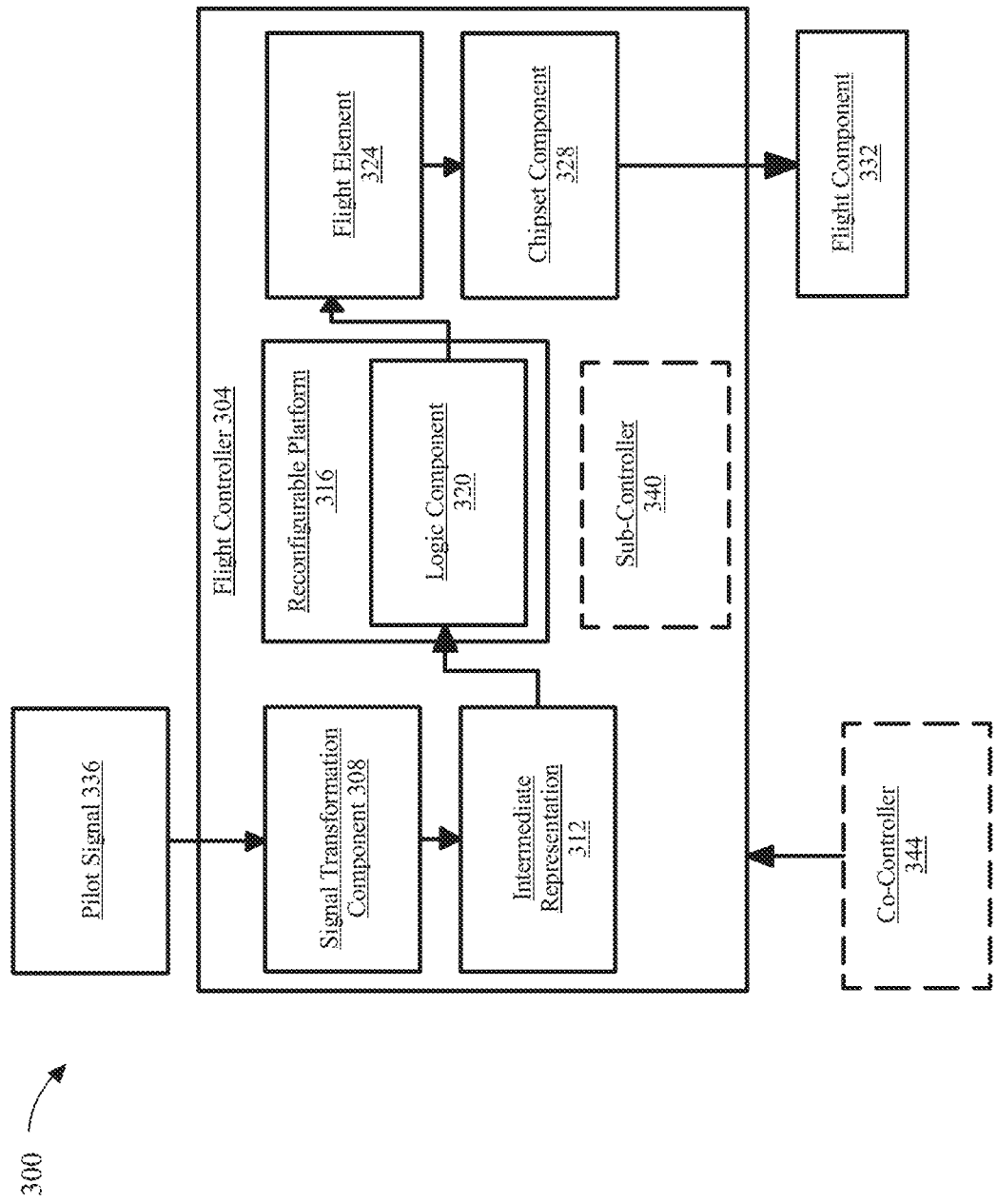
FIG. 3 is a block diagram of an exemplary flight controller.

Now referring to FIG. 3, an exemplary embodiment 300 of a flight controller 304 is illustrated. As used in this disclosure a "flight controller" is a computing device of a plurality of computing devices dedicated to data storage, security, distribution of traffic for load balancing, and flight instruction. Flight controller 304 may include and/or communicate with any computing device as described in this disclosure, including without limitation a microcontroller, microprocessor, digital signal processor (DSP) and/or system on a chip (SoC) as described in this disclosure. Further, flight controller 304 may include a single computing device operating independently, or may include two or more computing device operating in concert, in parallel, sequentially or the like; two or more computing devices may be included together in a single computing device or in two or more computing devices. In embodiments, flight controller 304 may be installed in an aircraft, may control the aircraft remotely, and/or may include an element installed in the aircraft and a remote element in communication therewith.

In an embodiment, and still referring to FIG. 3, flight controller 304 may include a signal transformation component 308. As used in this disclosure a "signal transformation component" is a component that transforms and/or converts a first signal to a second signal, wherein a signal may include one or more digital and/or analog signals. For example, and without limitation, signal transformation component 308 may be configured to perform one or more operations such as preprocessing, lexical analysis, parsing, semantic analysis, and the like thereof. In an embodiment, and without limitation, signal transformation component 308 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 308 may include transforming one or more low-level languages such as, but not limited to, machine languages and/or assembly languages. For example, and without limitation, signal transformation component 308 may include transforming a binary language signal to an assembly language signal. In an embodiment, and without limitation, signal transformation component 308 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 3, signal transformation component 308 may be configured to optimize an intermediate representation 312. As used in this disclosure an "intermediate representation" is a data structure and/or code that represents the input signal. Signal transformation component 308 may optimize intermediate representation as a function of a data-flow analysis, dependence analysis, alias analysis, pointer analysis, escape analysis, and the like thereof. In an embodiment, and without limitation, signal transformation component 308 may optimize intermediate representation 312 as a function of one or more inline expansions, dead code eliminations, constant propagation, loop transformations, and/or automatic parallelization functions. In another embodiment, signal transformation component 308 may optimize intermediate representation as a function of a machine dependent optimization such as a peephole optimization, wherein a peephole optimization may rewrite short sequences of code into more efficient sequences of code. Signal transformation component 308 may optimize intermediate representation to generate an output language, wherein an "output language," as used herein, is the native machine language of flight controller 304. For example, and without limitation, native machine language may include one or more binary and/or numerical languages.

In an embodiment, and without limitation, signal transformation component 308 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 3, flight controller 304 may include a reconfigurable hardware platform 316. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 316 may be reconfigured to enact any algorithm and/or algorithm selection process received from another computing device and/or created using machine-learning processes.

Still referring to FIG. 3, reconfigurable hardware platform 316 may include a logic component 320. As used in this disclosure a "logic component" is a component that executes instructions on output language. For example, and without limitation, logic component may perform basic arithmetic, logic, controlling, input/output operations, and the like thereof. Logic component 320 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 320 may be organized according to Von Neumann and/or Harvard architecture as a non-limiting example. Logic component 320 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 320 may include one or more integrated circuit microprocessors, which may contain one or more central processing units, central processors, and/or main processors, on a single metal-oxide-semiconductor chip. Logic component 320 may be configured to execute a sequence of stored instructions to be performed on the output language and/or intermediate representation 312. Logic component 320 may be configured to fetch and/or retrieve the instruction from a memory cache, wherein a "memory cache," as used in this disclosure, is a stored instruction set on flight controller 304. Logic component 320 may be configured to decode the instruction retrieved from the memory cache to opcodes and/or operands. Logic component 320 may be configured to execute the instruction on intermediate representation 312 and/or output language. For example, and without limitation, logic component 320 may be configured to execute an addition operation on intermediate representation 312 and/or output language.

In an embodiment, and without limitation, logic component 320 may be configured to calculate a flight element 324. As used in this disclosure a "flight element" is an element of datum denoting a relative status of aircraft. For example, and without limitation, flight element 324 may denote one or more torques, thrusts, airspeed velocities, forces, altitudes, groundspeed velocities, directions during flight, directions facing, forces, orientations, and the like thereof. For example, and without limitation, flight element 324 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 324 may denote that aircraft is following a flight path accurately and/or sufficiently.

Still referring to FIG. 3, flight controller 304 may include a chipset component 328. As used in this disclosure a "chipset component" is a component that manages data flow. In an embodiment, and without limitation, chipset component 328 may include a northbridge data flow path, wherein the northbridge dataflow path may manage data flow from logic component 320 to a high-speed device and/or component, such as a RAM, graphics controller, and the like thereof. In another embodiment, and without limitation, chipset component 328 may include a southbridge data flow path, wherein the southbridge dataflow path may manage data flow from logic component 320 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 328 may manage data flow between logic component 320, memory cache, and a flight component 332. As used in this disclosure a "flight component" is a portion of an aircraft that can be moved or adjusted to affect one or more flight elements. For example, flight component 332 may include a component used to affect the aircrafts' roll and pitch which may comprise one or more ailerons. As a further example, flight component 332 may include a rudder to control yaw of an aircraft. In an embodiment, chipset component 328 may be configured to communicate with a plurality of flight components as a function of flight element 324. For example, and without limitation, chipset component 328 may transmit to an aircraft rotor to reduce torque of a first lift propulsor and increase the forward thrust produced by a pusher component to perform a flight maneuver.

In an embodiment, and still referring to FIG. 3, flight controller 304 may be configured generate an autonomous function. As used in this disclosure an "autonomous function" is a mode and/or function of flight controller 304 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 324. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 304 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 304 will control the ailerons and/or rudders. As used in this disclosure "non-autonomous mode" is a mode that denotes a pilot will control aircraft and/or maneuvers of aircraft in its entirety.

In an embodiment, and still referring to FIG. 3, flight controller 304 may generate autonomous function as a function of an autonomous machine-learning model. As used in this disclosure an "autonomous machine-learning model" is a machine-learning model to produce an autonomous function output given flight element 324 and a pilot signal 336 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 336 may denote that a pilot is controlling and/or maneuvering ailerons, wherein the pilot is not in control of the rudders and/or propulsors. In an embodiment, pilot signal 336 may include an implicit signal and/or an explicit signal. For example, and without limitation, pilot signal 336 may include an explicit signal, wherein the pilot explicitly states there is a lack of control and/or desire for autonomous function. As a further non-limiting example, pilot signal 336 may include an explicit signal directing flight controller 304 to control and/or maintain a portion of aircraft, a portion of the flight plan, the entire aircraft, and/or the entire flight plan. As a further non-limiting example, pilot signal 336 may include an implicit signal, wherein flight controller 304 detects a lack of control such as by a malfunction, torque alteration, flight path deviation, and the like thereof. In an embodiment, and without limitation, pilot signal 336 may include one or more explicit signals to reduce torque, and/or one or more implicit signals that torque may be reduced due to reduction of airspeed velocity. In an embodiment, and without limitation, pilot signal 336 may include one or more local and/or global signals. For example, and without limitation, pilot signal 336 may include a local signal that is transmitted by a pilot and/or crew member. As a further non-limiting example, pilot signal 336 may include a global signal that is transmitted by air traffic control and/or one or more remote users that are in communication with the pilot of aircraft. In an embodiment, pilot signal 336 may be received as a function of a tri-state bus and/or multiplexor that denotes an explicit pilot signal should be transmitted prior to any implicit or global pilot signal.

Still referring to FIG. 3, autonomous machine-learning model may include one or more autonomous machine-learning processes such as supervised, unsupervised, or reinforcement machine-learning processes that flight controller 304 and/or a remote device may or may not use in the generation of autonomous function. As used in this disclosure "remote device" is an external device to flight controller 304. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 3, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 304 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 3, flight controller 304 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor, and the like thereof. Remote device and/or FPGA may perform the autonomous machine-learning process using autonomous training data to generate autonomous function and transmit the output to flight controller 304. Remote device and/or FPGA may transmit a signal, bit, datum, or parameter to flight controller 304 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 304 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 3, flight controller 304 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 3, flight controller 304 may include, but is not limited to, for example, a cluster of flight controllers in a first location and a second flight controller or cluster of flight controllers in a second location. Flight controller 304 may include one or more flight controllers dedicated to data storage, security, distribution of traffic for load balancing, and the like. Flight controller 304 may be configured to distribute one or more computing tasks as described below across a plurality of flight controllers, which may operate in parallel, in series, redundantly, or in any other manner used for distribution of tasks or memory between computing devices. For example, and without limitation, flight controller 304 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 3, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 332. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further includes separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 3, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 304. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 312 and/or output language from logic component 320, wherein output language may include one or more analog-to-digital conversions, low bit rate transmissions, message encryptions, digital signals, binary signals, logic signals, analog signals, and the like thereof described above in detail.

Still referring to FIG. 3, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 3, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 3, flight controller 304 may also be implemented using a "shared nothing" architecture in which data is cached at the worker, in an embodiment, this may enable scalability of aircraft and/or computing device. Flight controller 304 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, a node may include, without limitation a plurality of inputs x; that may receive numerical values from inputs to a neural network containing the node and/or from other nodes. Node may perform a weighted sum of inputs using weights w, that are multiplied by respective inputs xi. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight w, applied to an input x; may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w, may be determined by training a neural network using training data, which may be performed using any suitable process as described above. In an embodiment, and without limitation, a neural network may receive semantic units as inputs and output vectors representing such semantic units according to weights w, that are derived using machine-learning processes as described in this disclosure.

Still referring to FIG. 3, flight controller may include a sub-controller 340. As used in this disclosure a "sub-controller" is a controller and/or component that is part of a distributed controller as described above; for instance, flight controller 304 may be and/or include a distributed flight controller made up of one or more sub-controllers. For example, and without limitation, sub-controller 340 may include any controllers and/or components thereof that are similar to distributed flight controller and/or flight controller as described above. Sub-controller 340 may include any component of any flight controller as described above. Sub-controller 340 may be implemented in any manner suitable for implementation of a flight controller as described above. As a further non-limiting example, sub-controller 340 may include one or more processors, logic components and/or computing devices capable of receiving, processing, and/or transmitting data across the distributed flight controller as described above. As a further non-limiting example, sub-controller 340 may include a controller that receives a signal from a first flight controller and/or first distributed flight controller component and transmits the signal to a plurality of additional sub-controllers and/or flight components.

Still referring to FIG. 3, flight controller may include a co-controller 344. As used in this disclosure a "co-controller" is a controller and/or component that joins flight controller 304 as components and/or nodes of a distributer flight controller as described above. For example, and without limitation, co-controller 344 may include one or more controllers and/or components that are similar to flight controller 304. As a further non-limiting example, co-controller 344 may include any controller and/or component that joins flight controller 304 to distributer flight controller. As a further non-limiting example, co-controller 344 may include one or more processors, logic components and/or computing devices capable of receiving, processing, and/or transmitting data to and/or from flight controller 304 to distributed flight control system. Co-controller 344 may include any component of any flight controller as described above. Co-controller 344 may be implemented in any manner suitable for implementation of a flight controller as described above.

In an embodiment, and with continued reference to FIG. 3, flight controller 304 may be designed and/or configured to perform any method, method step, or sequence of method steps in any embodiment described in this disclosure, in any order and with any degree of repetition. For instance, flight controller 304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 4:
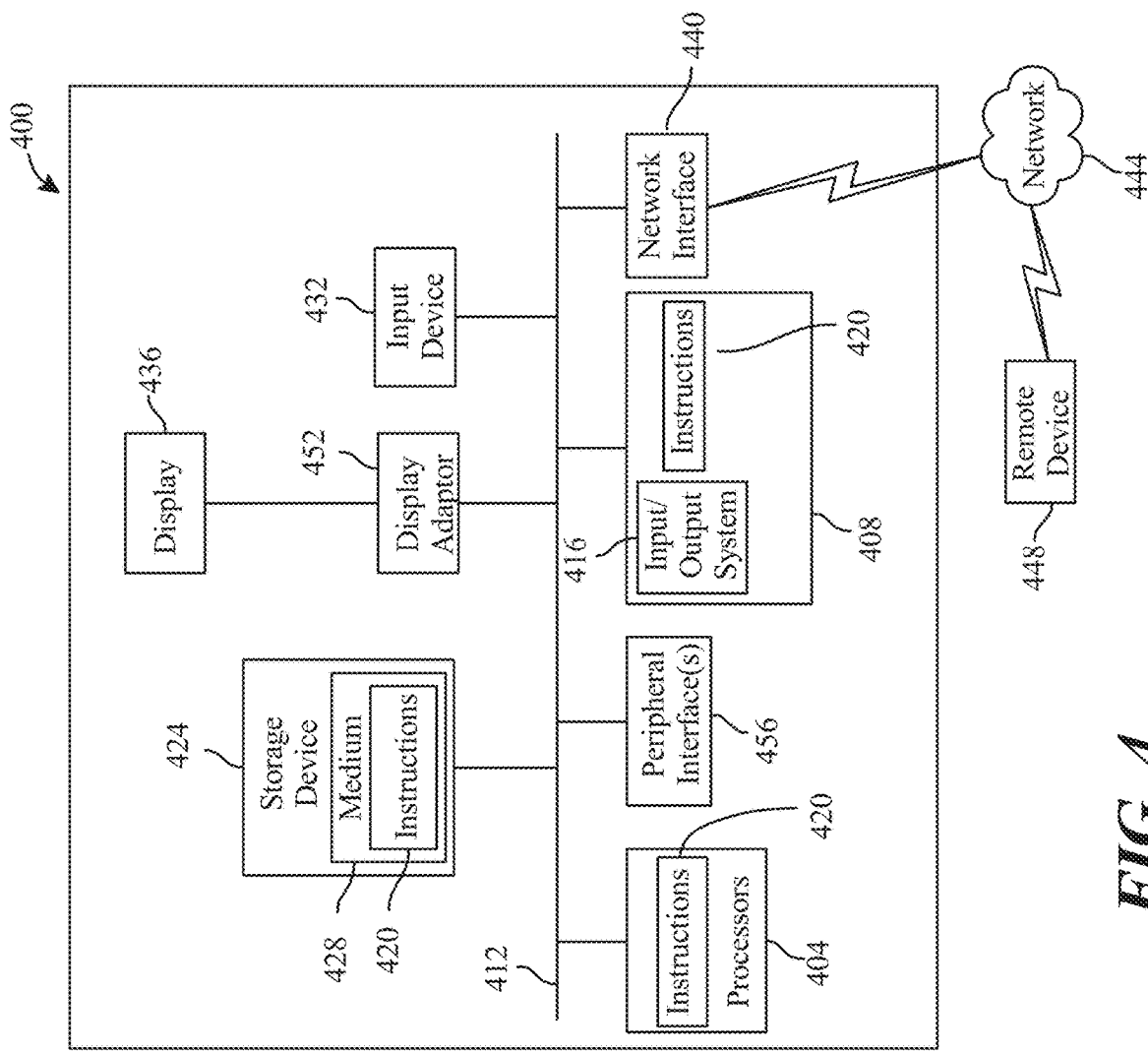
FIG. 4 is a block diagram of a computing system that can be used to implement any one or more of the methodologies disclosed herein and any one or more portions thereof.

FIG. 4 shows a diagrammatic representation of one embodiment of a computing device in the exemplary form of a computer system 400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 400 includes a processor 404 and a memory 408 that communicate with each other, and with other components, via a bus 412. Bus 412 may include any of several types of bus structures including, but not limited to, a memory bus, a memory controller, a peripheral bus, a local bus, and any combinations thereof, using any of a variety of bus architectures.

Processor 404 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 404 may be organized according to Von Neumann and/or Harvard architecture as a non-limiting example. Processor 404 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 408 may include various components (e.g., machine-readable media) including, but not limited to, a random-access memory component, a read only component, and any combinations thereof. In one example, a basic input/output system 416 (BIOS), including basic routines that help to transfer information between elements within computer system 400, such as during start-up, may be stored in memory 408. Memory 408 may also include (e.g., stored on one or more machine-readable media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computer system 400 may also include a storage device 424. Examples of a storage device (e.g., storage device 424) include, but are not limited to, a hard disk drive, a magnetic disk drive, an optical disc drive in combination with an optical medium, a solid-state memory device, and any combinations thereof. Storage device 424 may be connected to bus 412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 424 (or one or more components thereof) may be removably interfaced with computer system 400 (e.g., via an external port connector (not shown)). Particularly, storage device 424 and an associated machine-readable medium 428 may provide nonvolatile and/or volatile storage of machine-readable instructions, data structures, program modules, and/or other data for computer system 400. In one example, software 420 may reside, completely or partially, within machine-readable medium 428. In another example, software 420 may reside, completely or partially, within processor 404.

Computer system 400 may also include an input device 432. In one example, a user of computer system 400 may enter commands and/or other information into computer system 400 via input device 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 432 may be interfaced to bus 412 via any of a variety of interfaces (not shown) including, but not limited to, a serial interface, a parallel interface, a game port, a USB interface, a FIREWIRE interface, a direct interface to bus 412, and any combinations thereof. Input device 432 may include a touch screen interface that may be a part of or separate from display 436, discussed further below. Input device 432 may be utilized as a user selection device for selecting one or more graphical representations in a graphical interface as described above.

A user may also input commands and/or other information to computer system 400 via storage device 424 (e.g., a removable disk drive, a flash drive, etc.) and/or network interface device 440. A network interface device, such as network interface device 440, may be utilized for connecting computer system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 444, may employ a wired and/or a wireless mode of communication. In general, any network topology may be used. Information (e.g., data, software 420, etc.) may be communicated to and/or from computer system 400 via network interface device 440.

Computer system 400 may further include a video display adapter 452 for communicating a displayable image to a display device, such as display device 436. Examples of a display device include, but are not limited to, a liquid crystal display (LCD), a cathode ray tube (CRT), a plasma display, a light emitting diode (LED) display, and any combinations thereof. Display adapter 452 and display device 436 may be utilized in combination with processor 404 to provide graphical representations of aspects of the present disclosure. In addition to a display device, computer system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A vertical take-off and landing (VTOL) aircraft, wherein the aircraft comprises:
 a plurality of lift components affixed to each boom of a plurality of booms, wherein the boom comprises a fore end and an aft end;
 a fuselage comprising a fore end, an aft end, and a longitudinal axis; and
 a tail affixed to the aft end of the fuselage, wherein the tail comprises:
  a plurality of vertically projecting elements, wherein each vertically projecting element of the plurality of vertically projecting elements form an angle relative a horizontal plane extending through the longitudinal axis of the aircraft, wherein each vertically projecting element of the plurality of vertically projecting elements form a sweep angle relative a lateral plane of the aircraft, the lateral plane perpendicular to the longitudinal axis and the horizontal plane, wherein the plurality of vertically projecting elements comprises:
    a first vertically projecting element positioned to a first side of the fuselage; and
    a second vertically projecting element positioned to a second side of the fuselage; and
    the plurality of vertically projecting elements each are affixed at the aft end of a boom of the plurality of booms and are designed and configured to be positioned laterally outside of a wake from the plurality of lift components while the aircraft is engaged in conventional wing-borne flight; and
a plurality of laterally projecting elements that extend between a corresponding one of the vertically projecting elements and the fuselage and that each form an angle relative to the horizontal plane of the aircraft and a sweep angle relative to the lateral plane of the aircraft.

2. The aircraft of claim 1, wherein the aircraft is an electric aircraft.

3. The aircraft of claim 1, wherein the aircraft is a rotor-based aircraft.

4. The aircraft of claim 1, wherein the plurality of vertically projecting elements are positioned in a V-shaped formation.

5. The aircraft of claim 1, wherein the plurality of laterally projecting elements comprises:
    a first laterally projecting element positioned to the first side of the fuselage; and
    a second laterally projecting element positioned to the second side of the fuselage.

6. The aircraft of claim 5, wherein:
    the first laterally projecting element is mechanically affixed to a first boom rear end; and
    the second laterally projecting element is mechanically affixed to a second boom rear end.

7. The aircraft of claim 1, wherein the plurality of laterally projecting elements additionally comprises at least one elevator.

8. The aircraft of claim 1, wherein the aircraft further comprises at least a control surface located on each vertically projecting element of the plurality of vertically projecting elements.

9. The aircraft of claim 1, wherein two lift components of the plurality of lift components are mechanically affixed to each boom of the plurality of booms.

10. The aircraft of claim 1, wherein the aircraft further includes a plurality of fixed wings configured to generate lift, wherein the plurality of fixed wings are attached to the fuselage.

11. The aircraft of claim 10, wherein the plurality of fixed wings includes:
    a first wing attached to a first side of the fuselage; and
    a second wing attached to a second side of the fuselage.

12. The aircraft of claim 10, wherein each fixed wing of the plurality of fixed wings are mechanically attached to a boom of the plurality of booms.

13. The aircraft of claim 1, wherein the plurality of lift components comprises at least an electric motor, wherein the at least an electric motor is recessed within the boom.

14. The aircraft of claim 1, wherein the aircraft further comprises a flight controller configured to operate the plurality of lift components.

15. The aircraft of claim 1, wherein the aircraft further comprises a thrust component mounted to the aft end of the fuselage.

16. The aircraft of claim 15, wherein the thrust component comprises a pusher propulsor.

17. The aircraft of claim 16, wherein the aircraft further comprises a flight controller configured to operate the thrust component.

18. A vertical take-off and landing (VTOL) aircraft, wherein the aircraft comprises:
    a plurality of lift components affixed to each boom of a plurality of booms, wherein the boom comprises a fore end and an aft end;
    a fuselage comprising a fore end, an aft end, and a longitudinal axis; and
    a tail affixed to the aft end of the fuselage, wherein the tail comprises:
        a plurality of vertically projecting elements, wherein each vertically projecting element of the plurality of vertically projecting elements form an angle relative a horizontal plane extending through the longitudinal axis of the aircraft, wherein each vertically projecting element of the plurality of vertically projecting elements form a sweep angle relative a lateral plane of the aircraft, the lateral plane perpendicular to the longitudinal axis and the horizontal plane, wherein the plurality of vertically projecting elements comprises:
            a first vertically projecting element positioned to a first side of the fuselage; and
            a second vertically projecting element positioned to a second side of the fuselage; and
            the plurality of vertically projecting elements each are affixed at the aft end of a boom of the plurality of booms and are designed and configured to be positioned laterally outside of a wake from the plurality of lift components while the aircraft is engaged in conventional flight wing-borne; and
        a plurality of laterally projecting elements each affixed at the aft end of a boom of the plurality of booms, each extends between a corresponding one of the vertically projecting elements and the fuselage, and that each form an angle relative to the horizontal plane of the aircraft and a sweep angle relative to the lateral plane of the aircraft.

19. The aircraft of claim 18, wherein the plurality of laterally projecting elements comprises:
    a first laterally projecting element positioned to the first side of the fuselage; and
    a second laterally projecting element positioned to the second side of the fuselage.

20. A vertical take-off and landing (VTOL) aircraft, wherein the aircraft comprises:
    a plurality of lift components affixed to each boom of a plurality of booms, wherein the boom comprises a fore end and an aft end;
    a fuselage comprising a fore end, an aft end, and a longitudinal axis; and
    a tail affixed to the aft end of the fuselage, wherein the tail comprises:
        a plurality of vertically projecting elements, wherein each vertically projecting element of the plurality of vertically projecting elements form an angle relative a horizontal plane extending through the longitudinal axis of the aircraft, wherein each vertically projecting element of the plurality of vertically projecting elements form a sweep angle relative a lateral plane of the aircraft, the lateral plane perpendicular to the longitudinal axis of the horizontal plane, wherein the plurality of vertically projecting elements comprises:

a first vertically projecting element positioned to a first side of the fuselage; and
a second vertically projecting element positioned to a second side of the fuselage; and
the plurality of vertically projecting elements are designed and configured to be positioned laterally outside of a wake from the plurality of lift components while the aircraft is engaged in conventional wing-borne flight; and
a plurality of laterally projecting elements each are affixed at the aft end of a boom of the plurality of booms, each extends between a corresponding one of the vertically projecting elements and the fuselage, and that each form an angle relative to the horizontal plane of the aircraft and a sweep angle relative to the lateral plane of the aircraft, wherein the plurality of laterally projecting elements comprises:
a first laterally projecting element positioned to the first side of the fuselage; and
a second laterally projecting element positioned to the second side of the fuselage.

* * * * *